Aug. 11, 1970 D. W. BERNARD 3,524,155
SLOTTED-POLE SOLENOID
Filed Jan. 2, 1968 4 Sheets-Sheet 1
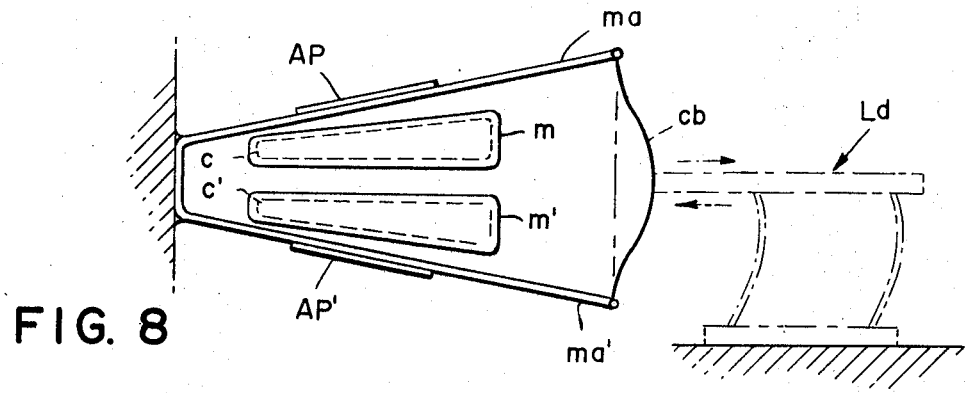
FIG. 8
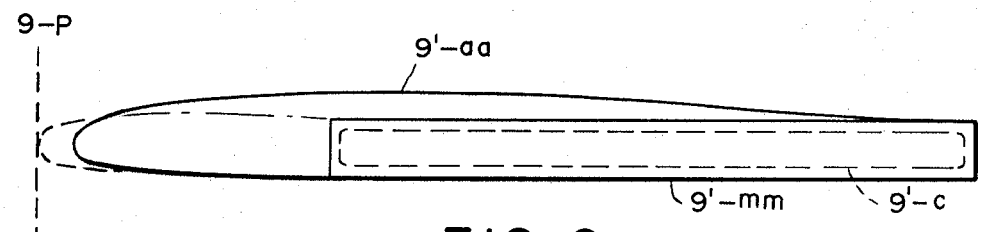
FIG. 9
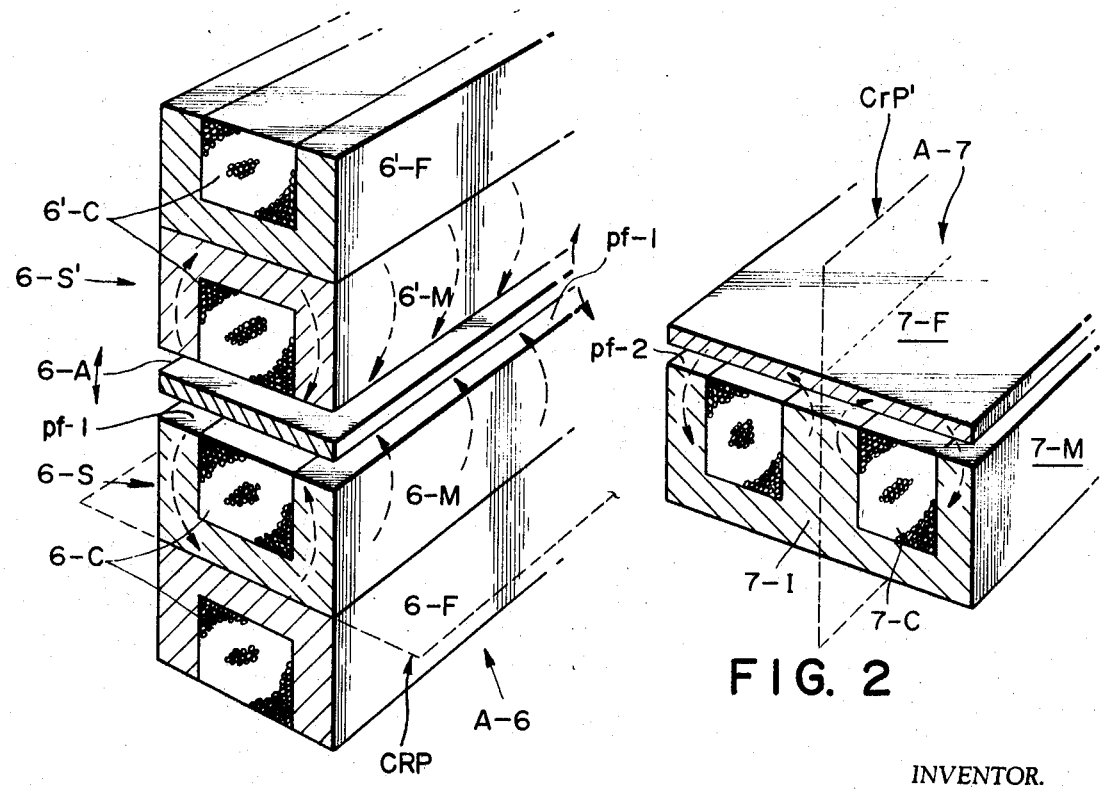
FIG. 1
FIG. 2
INVENTOR.
DAVID W. BERNARD
BY
John J. McConnel
ATTORNEY Aug. 11, 1970     D. W. BERNARD     3,524,155
SLOTTED-POLE SOLENOID
Filed Jan. 2, 1968     4 Sheets-Sheet 3

INVENTOR.
DAVID W. BERNARD
BY
John J. McCormack
ATTORNEY

Aug. 11, 1970   D. W. BERNARD   3,524,155
SLOTTED-POLE SOLENOID

Filed Jan. 2, 1968   4 Sheets-Sheet 4

INVENTOR.
DAVID W. BERNARD
BY
John J. McCormack
ATTORNEY

United States Patent Office 3,524,155
Patented Aug. 11, 1970

3,524,155
SLOTTED-POLE SOLENOID
David W. Bernard, Sherborn, Mass., assignor to Honeywell Inc., Minneapolis, Minn., a corporation of Delaware
Filed Jan. 2, 1968, Ser. No. 695,165
Int. Cl. H01f 3/00, 7/08
U.S. Cl. 335—279
4 Claims

ABSTRACT OF THE DISCLOSURE

A solenoid having an elongate armature and corresponding elongate, continuously-engageable, working pole-faces, portions of which are slotted in the direction of armature-contact with one or more solenoid coils embedded in the core.

FEATURES OF THE INVENTION

The art of designing solenoid magnetic actuators of the common "clapper" type is an aged and crowded one. Such actuators will be recognized as having a solenoid core body and associated solenoid coil (arranged so that when the coil is current-energized a magnetic attracting flux is projected from a pole face portion of the core) together with an armature segment mounted to be flux-intersecting so as to be attracted in a pivoting manner toward this pole face during flux-emission. In such an art apparently "minor" design advances will often have a significant and far-reaching effect. A typical form of this "clapper" comprises a U-shaped core with a solenoid coil wrapped around it, the core tips being arranged so that one, or both, projects the attracted flux; the armature being arranged to span the gap between these tips. This coil typically projects laterally far beyond the lateral confines of the armature, especially for narrow, strip armatures. In this and related constructions, with the "coil-axis" (that is, the plane about which the turns may be understood as wound) so projecting laterally beyond the confines of the armature-strip, lateral compaction of a set of such solenoids is somewhat of a problem. By contrast, the present invention provides a novel type of "clapper" solenoid construction quite distinct from the the aforementioned type, arranging the solenoid coil in one or more grooves through the core pole-face, the grooves being aligned along the line of armature-pole engagement ("contact-line") with the lateral cross section of the entire coil extending little, if at all, beyond the lateral cross section of the associated armature. This may be characterized as a "sloted-pole" solenoid and characterized as exhibiting a grooved pole-face adapted to present one or more coil-halves substantially along the contact-line (and preferably along a substantial portion thereof); or otherwise characterized as aligning a coil-winding axis substantially along the "contact-direction." Thus, it is an object of the present invention to provide the aforementioned and related features and advantages. Other related and more particular objects of the invention are, as follows:

To provide a "slot pole" solenoid construction; especially one having a U-shaped core with one coil-half along a pole-groove; or to do so with an E-shaped core construction presenting a pair of coil halves in respective pole-face grooves along the "contact-line"; especially in conjunction with a flexure-strip type armature; more especially in a "push/pull" magnet arrangement; more particularly doing such in an arrangement where a set of such "slot-pole magnets" are stacked laterally adjacent to provide a compact actuator set; particularly, also, in cases where a swinging-armature is operatively arranged with such a slotted pole magnet.

Other, related objects, are the following:

To provide a solenoid magnet arrangement including a "ring" type armature; more particularly, to provide such where this ring comprises a pair of bowed armature-strips cantilevered out from a common base in flux-intercepting rotation to be coupled adjacent their free tips; or especially where such a ring comprises a unitary loop for "push/pull" solenoid action; more especially, doing such in conjunction with "slotted-pole" type magnets having upper and lower pole-faces, each provided with a pair of coil-receiving grooves along the armature contact-line together with an embedded coil therein for attracting the adjacent, respective, upper and lower armature-loop-segments; or, more especially, where such a loop is adapted to surround the attracting magnet; even more especially where such a magnet comprises a U-shaped core with a solenoid coil therein; or where the loop comprises a single bowed section of a single flexure strip arranged along a pole-face and secured therebeneath to the magnet so as to provide an intermediate extensibly-bowing segment; or to generally, provide such a ring armature in the form of a pair of cantilevered armature-segments together with associated magnetic attracting means adapted to attract the segments to pull their free ends towards one another with a bowing flexure strip coupled between these free ends to be extensibly bowed during such attraction; most especially where said bowing flexure comprises a unitary resilient flexure-ring; or where the armature, itself, comprises a unitary armature-flexure-ring adapted to be flux-stressed in transverse directions, being squeezable in a first sense to be extended along a first direction and squeezable in a second, transverse, sense to be extended in a second, transverse, direction, together with a set of solenoid magnet means adapted to selectively project flux to so attract adjacent segments of this flexure-ring in a respective first or second direction.

Another object is to provide a "double slug" impacting arrangement wherein a pair of slugs is arranged in spaced relation and mounted from a fixed frame, being coupled with a pair of flexure strips so that driving one slug along its elongated axis will act to pull the other slug in relatively the same direction; more especially, doing such wherein one of said slugs is monuted from said fixed base on a magnetic flexure strip and a solenoid magnet means is provided operatively adjacent this strip for attraction thereof to initiate this double-slug thrusting action. The foregoing and other novel objects, features of invention, advantages and characteristics together with related ones will become more apparent to those skilled in the art upon consideration of the following disclosure embodiments in conjunction with the accompanying drawings.

One preferred embodiment, generally described, comprises a flexure armature/solenoid combination wherein the magnet pole is provided with a "slotted-pole" construction, comprising at least one slot cavity relatively along the contact-line of the armature, also having a solenoid coil embedded in each such cavity so as to project attracting flux along a substantial portion of the engaging pole-face area. In a fast-acting optimized "push/pull" version, this arrangement may be modified to include upper and lower pairs of such coil-embedded pole magnets surrounding the flexure-armature for attracting it positively into engagement with one pole face, while quickly disengaging it from the other.

Other objects, features, etc. will occur to those skilled in the art upon consideration of the following description in conjunction with the accompanying drawings wherein like reference symbols denote like elements, and wherein:

FIG. 1 is an isometric depiction of one embodiment of the invention including one form of the "slotted pole" electromagnet feature of the invention in a pair of co-operating solenoid core pieces;

FIG. 2 is an isometric of an embodiment like that of FIG. 1; however, exhibiting a modified "double" slotting of the core pole face;

FIG. 8 is an idealized side view of a pair of slotted-pole magnets and associated coupled armature segments like those in FIG. 4; however modified to include a bowing flexure coupling the armature tips;

FIG. 9 is an idealized side view of a slot pole magnet of any type modified to mount a novel bowed flexure armature constrained to function similar to the manner of the bowing flexure in FIG. 8;

Figure 10:
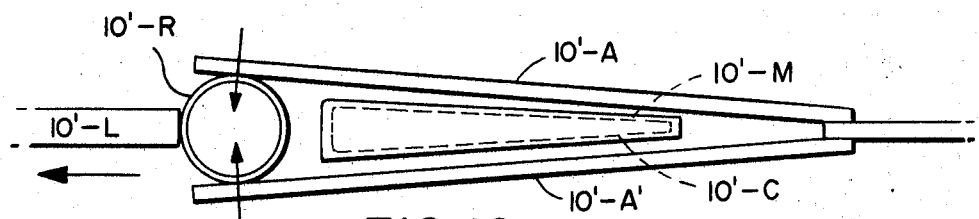
FIG. 10 is an idealized side view of an armature-magnet arrangement like that in FIG. 8 except that a single slot-pole magnet operates both opposed flexures, with the flexures coupled to drivingly "squeeze" a resilient squeeze-ring flexure driver between their tips.
Figure 11:
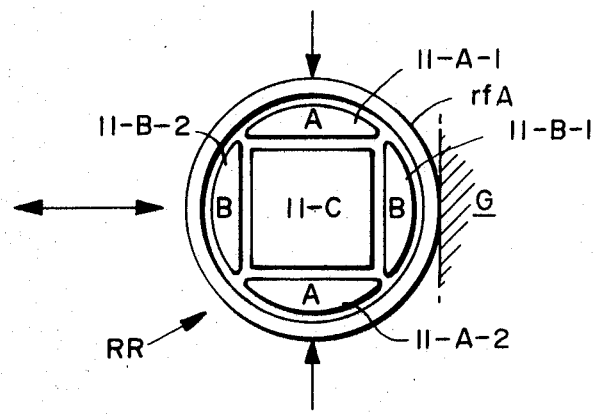
Figure 12:
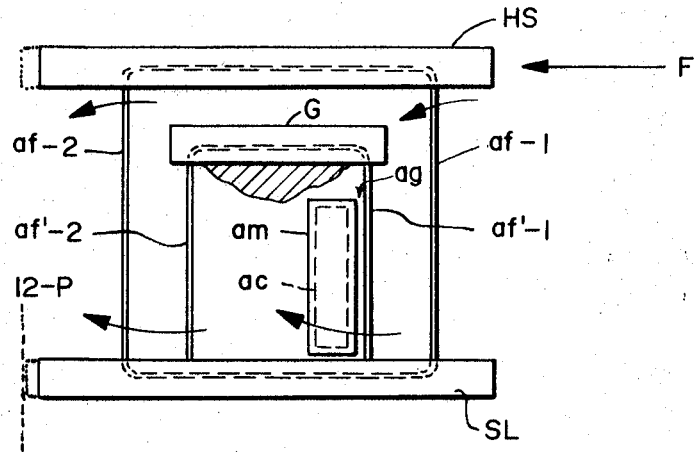

FIG. 11 is an idealized side view of an arrangement functionally similar ot that in FIG. 10, however, with the squeeze-ring serving also as a unitary armature structure and two pairs of opposed slot-pole magnets being arranged to distort it, each pair acting in one of two transverse squeeze directions; and FIG. 12 is a schematic side elevation of a very general slotted-pole magnet adapted to attract a support-armature and activate a print hammer load coupled to the armature in a novel "coupled-slug" pivot suspension.

Turning now to the description of these illustrated preferred embodiments, a general understanding of the novel slotted-pole solenoid feature may be had with reference to FIGS. 1 and 2. Either embodiment will be seen to modify a "clapper" type electromagnet solenoidal core (e.g. cores 6–M, 6–M' or 7–M) of the type adapted to be energized to project magnetic flux from its pole face and attract an armature piece pivotally thereto. These magnets will be understood to have their "flux axis" along the "pivot plane" (or "contact-plane"—of plane C$r$P' defined by armature motion) and exhibit a "slotted-pole" construction; i.e. have pole face portions grooved along the "engagement direction" to receive a solenoid coil-half therein. Thus, coil-halves 6–C, 6'–C and 7–C extend along the direction of armature engagement. The pivoting plane in FIG. 2 will thus be seen as defined by the relative armature-pole face motion (i.e. "engagement-direction" for armature 7–F toward or away from grooved, pole faces $pf$–2) and will be recognized as also aligned along the "flux axis" direction for the respective coil 7–C (i.e. the direction along the respective coil reference plane C$r$P' extends, analogous to the plane about which the coil wraps). The orthogonal coil reference plane CRP for coils 6–C (6–C' similar) in FIG. 1 (or its "coil-wrap plane") similarly extends along the "engagement direction" (for respective armature 6–A).

More particularly, according to the magnet embodiment A–6 in FIG. 1, an elongate magnetizable flexure-strip armature 6–A is pivotally mounted (by means not shown) and magnetically attractable to either of two opposed "slot-pole" clapper type electromagnets (upper and lower magnets 6–S', 6–S, respectively) to be flux-attracted selectively, to one or the other, as understood in the art (full-line pivoting arrows). Each solenoid magnet is similar, being the novel "slotted-pole" type. The lower magnet will be exemplarily described and is comprised of a core (6–M) of conventional magnetic material having a contact-face (pole-face $pf$–1) and, according to this feature, this pole-face is grooved along the line of armature contact so as to accommodate a coil-half (half of coil 6–C in the groove in $pf$–1). It will be apparent that such a "contact-line" groove, with the coil therein, will effectively attract the armature (given appropriate, conventional energization) and provide one coil-winding support.

More particularly, and according to a feature of manufacturing convenience, each magnet core (e.g. lower magnet core 6–M) may be attached to a non-magnetic coil-form (e.g. lower form 6–F); similarly grooved to receive and contain the other coil half (here, the other half of 6–C). Attaching the core and form together (e.g. welding) with their central grooves in registry will conveniently form a spool for the associated coil (e.g. which may be wound thereon). Upper magnet 6–S' is similarly constructed to include a magnetic core 6'–M and attached form 6'–F, both centrally grooved along the "engagement-direction," and in registry, to receive an associated solenoid 6'–C (both coils shown sectioned into two halves merely for clarity of illustration). The forms may of course be dispensed with where desired.

Workers in the art will recognize that such a coil-embedment in this slotted-pole construction can afford many significant advantages. For instance, it will be apparent that an advantageous lateral compacting of the magnet assembly (i.e. transverse the "engagement direction") is effected, without sacrificing solenoid power. For instance, total effective flux may be kept reasonably high (with a large number of coil turns wrapped into those pole-face grooves). One graphic illustration of this compacting advantage is afforded in the description below of the embodiment in FIG. 6.

Workers will also recognize that such "slotted-pole" magnets can cooperate quite advantageously with flexure type armatures. For this purpose it may be assumed that armature 6–A comprises a thin magnetic flexure-strip arranged so as to be solenoid-attracted (onto pole face $pf$–1 when coil 6–C is current-energized). It will be noticed that with such a slotted-pole construction and the coil extending along a substantial portion of the armature contact-line, this type of flexible armature may be pulled-in (or released) in a much more gradual, continuous manner than with conventional construction. Such a coil arrangement can project a "longitudinal" magnetic field entirely along flexure-strip 6–A without the abrupt discontinuities in flux-intensity characteristic of typical prior art constructions. With such a uniform longitudinal field, the attractive flux force will be more uniformly distributed and continuously acting, causing the armature-flexure strip to "peel" and "unpeel" very gradually from the pole face. Workers in the art will perceive other equivalent "slot-pole" constructions wherein a clapper type magnet can be adapted to present coil halves along substantially the entire "contact-line."

According to an improvement feature of this embodiment (FIG. 1), it will be evident that, although one such "slotted-pole" magnet may be used to pivot armature 6-A, using two opposed such magnets in "push/pull" relation can be especially advantageous. That is, it will be apparent that two like magnets may be disposed in the manner of magnets 6-S and 6-S' on opposite sides of an armature to cooperate in driving it into either of two conditions. That is, with coil 6-C "on" and armature 6-A held attracted on associated pole-face $pf-1$; the contemporaneous, de-energizing of coil 6-C and energizing of coil 6-C' will apply two supplementary forces to very quickly and positively release 6-A from face $pf-1$ (also attracting it against upper core 6'-M, if desired). This "push/pull" solenoid arrangement may be adapted, for certain cases so that one or both magnet cores comprise a permanent magnet oppositely-poled to the solenoid-flux so that when the coil is energized, the core will generate an opposing flux (repelling force) to help release the armature. Conversely, a permanent magnet core 6-M may normaly attrack armature 6-A while coil 6-C, when selectively energized, will repel 6-A from the magnet. In either case, each slot-pole magnet could, by itself, provide "push/pull" action. For illustrative dimensions, I have found that the length of each U-shaped core piece might typically be on the order of 1 to 4 inches with a width on the order of a few tenth-inch and a groove on the order of a few hundredths-inch wide.

FIG. 2 shows a somewhat modified embodiment A-7 comprising a clapper type solenoid magnet with a "slotted-pole" core 7-M and associated "horizontal" solenoid coil 7-C (coils 6-C, 6-C' may be styled "vertical") and with a flexure-armature 7-F, understood as selectively attracted to the pole-face ($pf-2$) as before. This embodiment will be understood as similar in construction and operation to the foregoing embodiment, except for the indicated modification features. Where the elongate pole-face portions of the magnets in embodiment A-6 above had a single central groove (a pole-slot, providing a U-shaped core with two, spaced pole-face surfaces), the instant magnet pole-face $pf-2$ is provided with two such grooves, symmetrically arranged along the "engagement direction" (aligned along reference plane CrP', here). This will generate the indicated E-shaped core 7-M which includes an added center-pole portion 7-1, around which both halves of the coil 7-C may be wrapped, presenting three pole-face surfaces. Here, as in magnet A-6, a uniform longitudinal field is provided along the armature length, the attractive flux-force thereof being continuous therealong, such as will induce a flexure strip type armature (7-F may be such) to "peel" and "unpeel" from the pole face surfaces $pf-2$. Core 7-M may be similar to 6-M except for central piece 7-I (which may be about 20 mils wide, the other two pole face portions, each being about 10 mils wide, leaving about 30 mils width for each coil-groove). Here, of course the coil is oriented horizontally (where coil 6-C in FIG. 1 is vertical) and its flux pattern (as shown by the dotted-line arrows) will be somewhat different from that of magnet A-6, being sub-divided across the narrow elongate width of flexure 7-F and returned through the core (rather than tnrough air). For this reason, and others, this type of "slotted-pole" magnet is believed more efficient than that of FIG. 1 and often preferable. For maximum compactness however, an embodiment like A-6 will be preferable.

Figure 3:
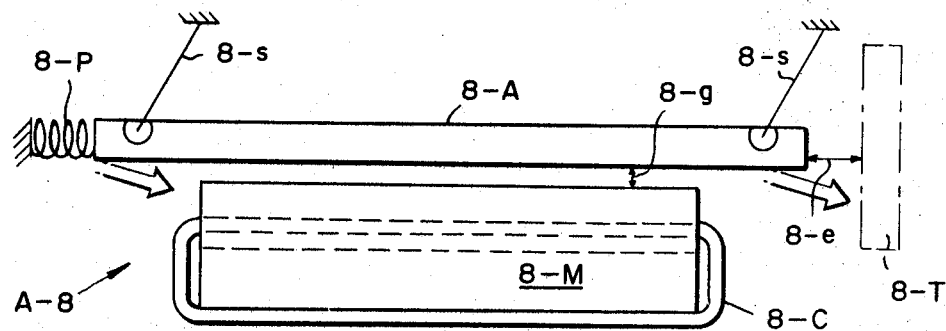
FIG. 3 is a schemtaic side elevation of a slotted-pole magnet piece similar to one of the pieces in FIG. 1 together with a cooperating "pendulum suspended" armature.

An alternate "slotted-pole" embodiment A-8 is indicated in FIG. 3 where a "U-core" magnet like those in FIG. 1 is indicated (very schematically), together with a "swinging armature" 8-A. Here, a magnetic core 8-M is pole-slotted to be wrapped with a solenoid coil 8-C and adapted to attract swinging armature 8-A. Armature 8-A is pivotably suspended on a pair of pendulum arms 8-S and spring-biased, by spring 8-P, to normally assume the indicated "rest" position disposed a prescribed distance ("working gap" $8-g$) from the pole-face surface of core 8-M. Armature 8-A will be understood as selectively solenoid-attracted toward 8-M (arrows) as understood in the art, this embodiment being constructed and operated generally like the preceding embodiments except where specified. It will be apparent that the attraction of armature 8-A toward magnet 8-M (upon the application of current to coil 8-C) is arranged to thrust it with a transverse thrusting component (arrow $8-e$). That is, when armature 8-A is attracted (against the bias of return spring 8-P) and as gap $8-g$ closes, one impact end of 8-A will describe a lateral thrust motion, transverse to gap $8-g$. This selective thrust motion, generally transverse the direction of magnetic attraction and along an impact excursion to drive load 8-T, may be employed in many ways perceptible to the art. For instance, a printing impact thrust against a prescribed print platen may be so effected.

Figure 4:
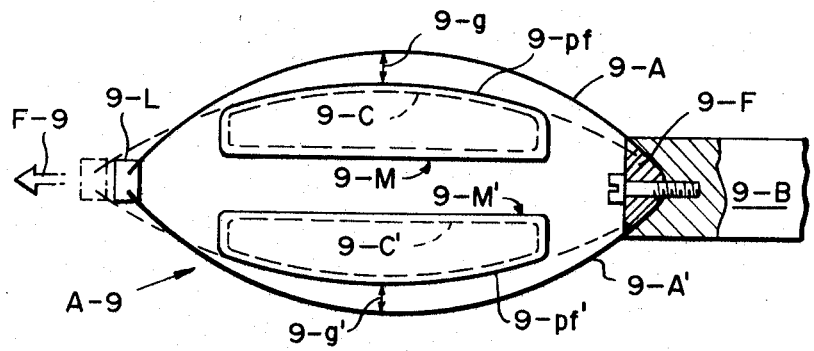
FIG. 4 is a very schematic side elevation of a pair of separate slotted-pole magnets each similar to those in FIGS. 1 and 3, each with an associated flexure armature and the two armatures coupled.

FIG. 4 shows an embodiment A-9 similar to the foregoing as regards "slotted-pole" magnets, but modified to include a "squeezing flexure" arrangement according to another feature. Here, a pair of curved-face, slot-pole magnets 9-M, 9-M' are schematically indicated, these being similar to the "U-core" magnets of FIG. 1 (or otherwise provided—even a single magnet might suffice if contact of both armatures can be assured). And like the embodiment in FIG. 3 this is intended to effect a thrust (F-9) transverse to the direction of magnetic attraction. Moreover, actuator A-9 introduces a "coupled-flexure" feature whereby a pair of "bowed," coupled flexure strips may be tied together at a relatively common pivoting point, adjacent their free ends to be "squeezed together" and thrust transversely when the solenoid is energized. More particularly, embodiment A-9 comprises a pair of bowed magnetic flexure strips 9-A, 9'-A, both pivoted from a common fixed support 9-B, clamped there at one end (e.g. by a common clamp 9-F) to project out in oppositely-bowed (pre-flexed) somewhat symmetrical, cantilevered fashion to be coupled (e.g. to common load 9-L) adjacent their free ends. Each strip is disposed in operative relation with a respective magnet (9-M, 9-M'), presenting a respective pole-face ($9-pf$, $9-pf'$) which is grooved to include a respective coil (e.g. pole-slotted as in FIG. 1). According to this feature pole faces $9-pf$, $9-pf'$ are also preferably curved to conform to the prescribed flexure-contacting curvature (respective coils 9-C, 9-C' are indicated very schematically in phantom). Armatutre strips 9-A, 9-A' are thus arranged to be normally presented in attractable confrontation with a respective pole-face, being spaced therefrom a prescribed magnetic gap ($9-g$, $9-g'$, respectively) so that the energization of the respective coil will attract the strips inwardly against that pole-face to assume as "actuated" configuration (schematically indicated by phantom outline of armatures and load). This "actuated" condition will be seen to effect a forward thrusting along direction F-9 (of load 9-L) transverse to magnetic gaps $9-g$, $9-g'$, such as to effect the translation indicated in phantom. Thus, a small solenoid-induced, displacement of flexure strips 9-A, 9-A' may produce a relatively transverse thrust in such an arrangement. This is a use of a slotted-pole (or other) solenoid, to attract an armature system in a novel coupled-armature mode that has some unique advantages. In certain cases, the actuated excursion distance may effect an amplification of the solenoid-attraction distance ($9-g$). Here, as in FIG. 3 (and elsewhere except where otherwise indicated) the U-core structure may be replaced by an E-core structure (e.g. for increased efficiency) or the like. Indeed, as before suggested, where a mismatch of flexure-setting is not feared, a single (U-core) slotted-pole magnet could be substituted (e.g. in the manner of FIG. 5).

While the foregoing embodiments have indicated individual, spaced "slot-pole" solenoid magnets a number of these may be "stacked," being packed together, side-by-side, more compactly than prior art magnets. For instance, it was noted with respect to the embodiment of FIG. 1 that wrapping a coil vertically and aligning it with the contact-line in a pole-slot effects a space-saving transverse to the contact-line. This feature allows a greater number of magnets to be packed side-by-side in a given space, thus facilitating a higher density of solenoids in a given package space—something extremely advantageous in such "crowded" multi-solenoid environments as card-punch actuators or print-slug actuators (in a high speed printer). FIG. 6 illustrates such a side-by-side solenoid compaction in a printer environment. Here, a set of actuators A–10 is exemplarily, illustrated (only two solenoid actuators) being shown), each being adapted for effecting print-hammer actuation at successive, closely spaced print positions in a high speed printer apparatus. For this embodiment, a typical high speed print-wheel PR may be understood as presenting successive rows of raised type font, along a given print-plane, for the selective impacting thereof by "selected" print-hammer units (e.g. slugs H–1, H–2 etc.). These hammers are closely aligned at adjacent print positions along the print plane to be print-impacted against an intermediate paper/ribbon medium (not shown, but well understood in the art). Thus, at each print position (column) along this plane a "slotted-pole" solenoid magnet (e.g. magnet 10–M–1 for column #1) is arranged to operate a slug mounting hammer bar (here, a flexure-armature strip, e.g. strip 10–A–1 for magnet 10–M–1). Each such strip is arranged to present a respective print hammer slug H (mounted at the free end thereof, by means not shown, but well understood) to be attracted, pivotingly, toward the pole face of the associated magnet and thus print thrust this slug. Thus, a pole-face position of each such solenoid magnet (including an associated coil CL) is understood as preferably curved to wrap its armature strip 10–A gradually down to itself being curved to conform thereto in effecting the intended printing impact. Embodiment A–10 will be understood as otherwise constructed and operated like the foregoing embodiments.

Thus, for instance, hammer slug H–1 (for print-position #1) may be mounted on the end of flexure-armature strip 10–A–1 to be print-wheel impacted when strip 10–A–1 is gradually attracted toward the curving pole-face magnet core 10–M–1 (here, U-shaped as in FIG. 1, with a pair of upper and lower registering, coil-receiving slots SL–1 for the associated solenoid coil CL–1, schematically indicated). An adjacent aligned hammer slug H–2, next to H–1, is adapted for operation at the second print position being similarly mounted on the end of its armature strip 10–A–2, which is adapted to be attracted pivotingly against the face of associated magnet core 10–M–2 which is, preferably, spaced from the first core 10–M–1 (i.e. to be flux isolated by a non-magnetic spacer block 10–SP–1, or the like). Spacers 10–SP–1 etc., are made non-magnetic to eliminate "cross talk" or the line interference between coils. In a similar manner, the other print positions may be provided with respective hammers and driving "slotted-pole" magnets compacted closely together.

Figure 6A:
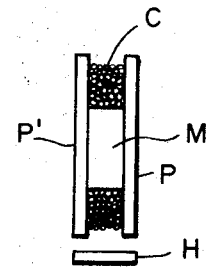
FIG. 6A being a section through an illustrative core-armature structure.
Figure 6:
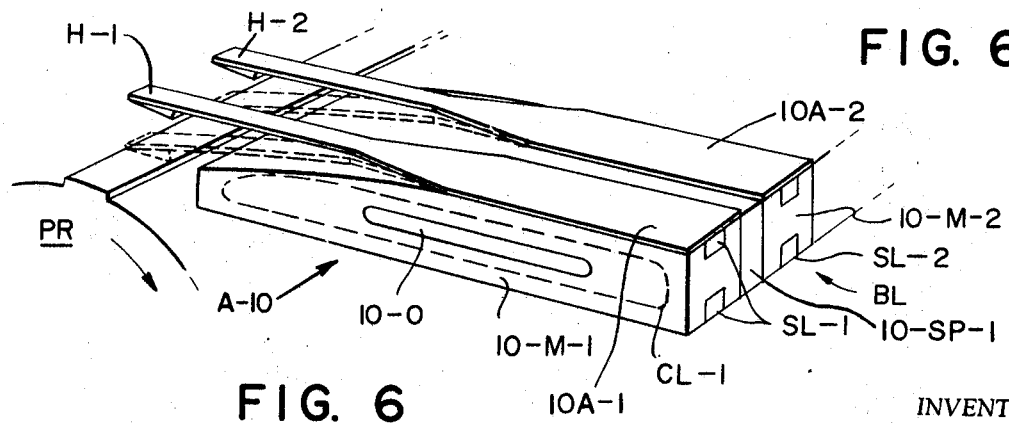
FIG. 6 is an isometric of a plurality of laterally-stack slotted pole magnets each generally like one of those in FIG. 1, with its pole face modified somewhat, together with an associated flexure armature.

According to a refinement feature, each hammer slug and flexure bar may be arranged to "whip" past the end of the magnet pole face to impact (the paper against print roll PR) with a self-returning action, being automatically spring-returned to rest position of its own resilience. According to a further refinement feature, this array of armature-solenoids may be formed and assembled in an integral package, being made in identical modules and mounted in alignment, for instance, by provision of a registering central bore 10–O through all solenoid cores 10–M and the like. Similarly, a common solenoid block may be used for all coils being comprised of a block of magnetic material grooved above and below along each print position, each being wound with a separate coil common for all columns.

Where advantageous, each individual solenoid may be fabricated in the "H-configuration" as indicated in FIG. 6A. For instance, this may comprise a central, permanent magnet core M (such as a ceramic magnet, "poled" to attract the associated flexure strip H in a prescribed direction, toward or away from itself) and a pair of magnetizable, low-reluctance pole plates P, P' attached on either side of magnet M to effectively form (flux-conducting poles and) a channel in which the associated solenoid coil C may be wrapped, as known in the art. Coil C may be poled the same as (or opposite to) magnet M and thus assist in attracting flexure H (or oppose it, which ever is desired). For instance, the magnet may be used to hold armature H and the coil C selectively release it by application of suitable current therethrough.

A further improvement feature of slotted pole magnets like the "H-configuration" indicated in FIGS. 6 and 6A (also suggested in FIGS. 1, 3, 4, 5 and 7–11) is that providing ready accommodation for a central bore, like bore 10–O in FIG. 6, they may be very effectively cooled (by centrally-circulated coolant). This is a very significant advantage in many applications.

Figure 5:
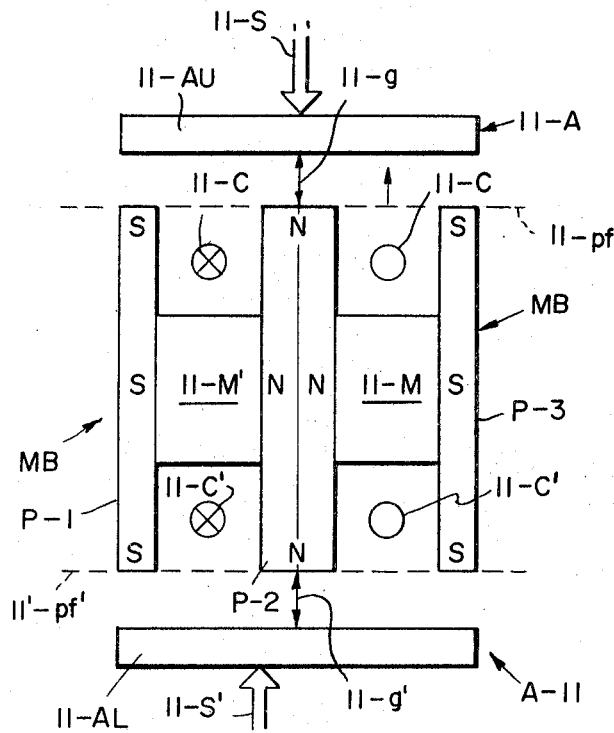
FIGS. 5 and 5A are, respectively, front sectional and side elevation views of a pair of stacked, upper and lower double slot magnets each like that in FIG. 2 but modified somewhat, each magnet operatively associated with a flexure strip armature segment, the two segments responding as a unitary structure.
Figure 5A:
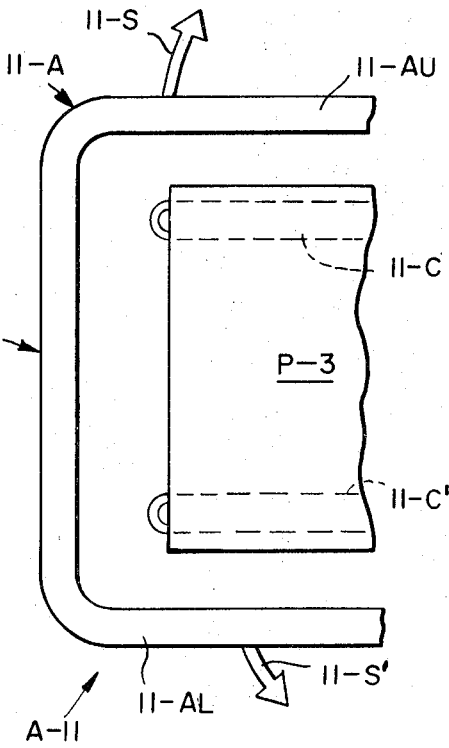
Figure 7:
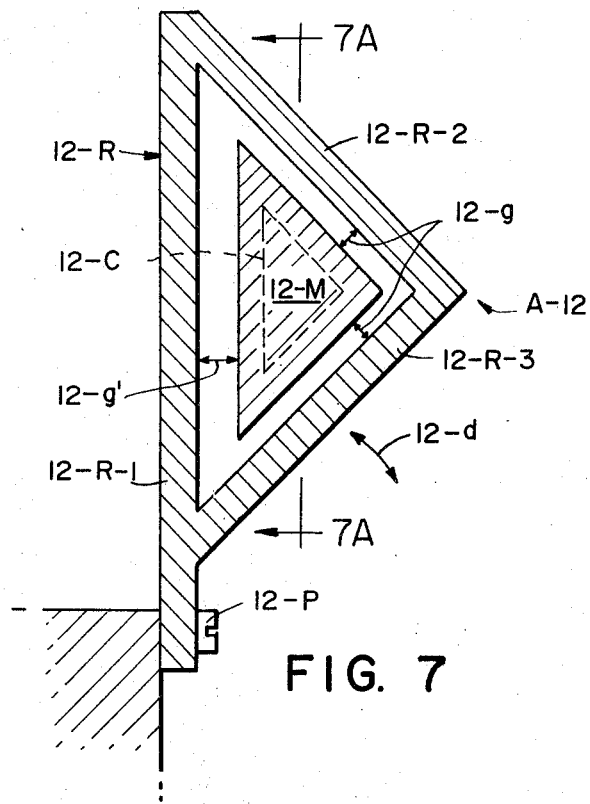
FIG. 7 is a schematic side section of an embodiment constituting a further modification of those shown in FIGS. 4 and 5, with a single slotted-pole magnet having two working pole-faces and a surrounding unitary armature piece.

According to another improvement feature, such a "slotted-pole" solenoid as here taught may be arranged in operative combination with a "ring-armature"; i.e. one arranged to surround at least a portion of the solenoid core (similar to the construction in FIG. 4) as indicated in FIGS. 5 and 7. For instance, in FIG. 5 and 5A a double-slotted-pole solenoid embodiment MB (somewhat similar to 9–M above) is shown including such a "ring" (or loop) type armature A–11. Here, solenoid magnet assembly MB is arranged to be selectively energized to one of two polarities (current directions) to attract upper and lower portions of the integral (flexure) armature loop system A–11 (upper and lower portions 11–AU, 11–AL, respectively), these being attractive, respectively, in directions 11–S, 11–S'. More particularly, ring armature A–11 may be understood by those skilled in the art as comprising a magnetizable, flexible, looped integral strip of material, pivot-mounted (from means not shown, but readily understood in the art), to relatively symmetrically surround a portion of the cores in solenoid assembly MB so that the upper and lower portions are spaced at prescribed operating gaps 11–g, 11–g' from respective pole-face portions (planes 11–pf, 11–pf', respectively); in relatively conventional operative relation (registry and coplanarity) therewith. Solenoid MB preferably includes a pair of permanent magnet cores (11–M, 11–M'), each having an associated outboard pole plate (P–3, P–1, respectively) attached thereto together with an intermediate, common pole plate (P–2), these plates being connected to the cores and arranged to register so as to define upper and lower pole-face planes 11–pf, 11'–pf. This arrangement of cores and plates thus forms, effectively, a pair of coil-receiving channels along each pole-face much in the manner indicated in FIGS. 6 and 6A, each pole-face being E-shaped as in FIG. 2 and adapted to receive an associated solenoid-coil (11–C', 11–C).

Coils 11–C, 11–C' are preferably oppositely wound (as schematically indicated) so as to act oppositely in a "push/pull" manner, attracting the flexure-loop 11–A in either one direction or the other (11–S or 11–S'). For instance, with magnetic cores 11–M, 11–M' similarly poled (as indicated in FIG. 5) and being understood as arranged to attract a respective armature segment (e.g. upper segment 11–AU, in direction 11–S by coil 11–C), the magnets may be understood, when energized with a sufficient current, to produce supplementary magnetic forces, adding to the permanent magnetic flux aforementioned, so as to pull a respective loop portion into contact along the respective engagement plane (e.g. loop segment 11–AU onto plane 11–pf). Conversely, the other coil 11–C' may be oppositely energized so as to supplementarily pull the other flexure section (e.g. 11–AL) in the opposite direction whereby the magnets may assist one another. That is, the flux from coil 11–C' will both assist in the disengagement of upper portion 11–AU and, in the attraction of lower portion 11–AL (into contact with the lower pole-face 11–pf'). Other forms of this embodiment will come to mind. It will be understood that magnets 11–M, 11–M' perform an advantageous holding function (a magnetic latch) and related advantages. Also, it will be realized that in this "push/pull" operation of embodiment MB, it is not necessary that both upper and lower portions (11–AU, 11–AL) come into contact with the magnet assembly MB. In certain cases only one will be adapted to contact the magnet, the coils being used to assist in the attracting-contact and in the opposing-release.

Figure 7A:
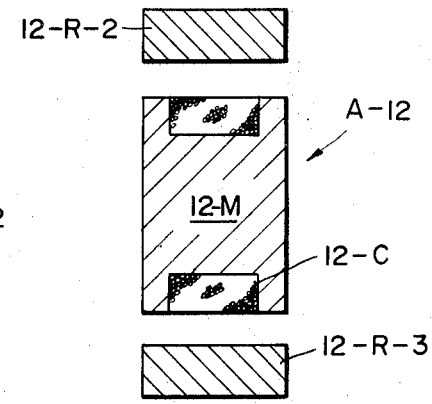
FIG. 7A being a section through the core armature of FIG. 7.

FIGS. 7 and 7A indicate (in schematic cross sectional and front sectional views, respectively) an embodiment A–12 similar, in many respects to aforedescribed embodiment A–11 and others, being somewhat modified and differing only in the following specified respects. The flexure-armature portion of embodiment A–12 comprises a "closed-loop" flexure-strip 12–R which is magnetically attractable and pivotably mounted, such as at clamp 12–P from a fixed base to be solenoid-attracted by an associated solenoid magnet 12–M and coil 12–C (such as in the direction 12–D indicated). Magnet 12–M is "H-configured" (as FIG. 7A indicates), being provided, along a closed, continuous peripheral face thereof, with a groove to receive an associated closed-loop coil 12–C which, upon energization, is adapted to establish an attracting flux from exposed pole-face portions defining a pair of working gaps 12–g, so as to attract confronting armature segments 12–R–2, 12–R–3 to be moved in the indicated direction 12–d. These pole portions will be understood as conformed for this contact and gaps 12–g will be understood as substantially less than isolation gap 12–g' (not "working"). Attracted segments 12–R–2, 12–R–3 are linked by segment 12–R–1 (closing the ring). It will be noted by those skilled in the art that among other features, embodiment A–12 presents a relatively large pole area and associated flexure area, along with optimal usage of the pole-face area and coil, yet being compact in the aforedescribed sense. It will be understood that the resultant force in the desired direction 12–d of actuation will comprise a resolving of the total magnetic forces applied between magnet 12–M and armature 12–R.

Workers in the art may visualize other applications of the "coupled-armature" feature (besides those in FIGS. 4, 5 and 7); especially in combination with a cooperating slotted-pole solenoid. FIGS. 8–11 indicate some such applications. For instance, in FIG. 8 a pair of armature segments ma, ma' are cantilevered out from a fixed base in opposed, divergent relation, to be presented in operative attracted relation with respective solenoid magnet means, such as slotted-pole magnets m, m', including respective coils c, c'. Armatures ma, ma' may (but need not) be flexible and integral. They may include magnetizable portions such as portions AP, AP' or be otherwise made magnetic. This armature-solenoid arrangement may be understood as generally similar to those in FIG. 4, etc., except where specified otherwise, as may the analogous arrangements in FIGS. 8–12 (described below). Armatures ma, ma' are further coupled adjacent their free tips by a bowing flexure means, such as indicated flexure strip cb (unbowed, static condition in phantom). Such a flexure coupling will be understood as adapted to effect a lateral thrusting (e.g. on a print-slug load Ld, indicated here in phantom in "actuated condition"). Thus, armatures ma, ma' may be understood as indicated in "attracted" condition (toward respective magnets, m, m').

FIG. 10 shows an arrangement similar to that in FIG. 8 in including armature segments 10'–A, 10'–A' pivotally mounted to be attracted together by a common solenoid magnet 10'–M (with coil 10'–C); the free armature tips, however, being coupled to flex a somewhat different load, namely flexure-ring 10'–R (in direction of arrows). That is, ring 10'–R may be understood to be selectively "squeezed" (distorted) by the armature tips so as to buckle-outward thrustingly such as to drive illustrative load 10'–L reciprocatingly.

FIG. 11 shows an embodiment RR similar to that in FIG. 10 in that a flexure-ring structure rf–A is adapted to be selectively "squeezed" for actuation thrusting by solenoid means; however, here the solenoid means is modified to comprise two cooperating pairs of magnets A and B, (that is "horizontal" and "vertical" magnets 11–A–1/11–A–2 and 11–B–1/11–B–2 respectively). Here, however, the flexure ring rf–A is, itself, made magnetic and solenoid-attractable, being mounted from some thrust-base such as base G. Thus, if one pair of solenoids (A) is energized to squeeze the ring in one sense (vertically down) and, then, the other pair (B) is energized to squeeze it in a transverse sense (horizontally-in), the ring structure may be made to exert oscillatory transverse actuation thrusts (e.g. thrust horizontally back and forth as indicated by arrows).

FIG. 12 indicates a novel "coupled-slug" type suspension whereby a pair of load members may be mounted in flexible-coupled relation and one suspended from a fixed base so that an axial thrust on one will, sympathetically, pull the other drivingly. Thus, slug members HS, SL are coupled by flexure strips af–1, af–2 with member SL also flexure-mounted (pivotingly) from fixed base G (by flexure strips af'–1, af'–2 so that an axial thrust on one member, e.g. force F on HS to drive in as indicated in phantom) will pull the other sympathetically (e.g. member SL pulled to "actuated-plane" 12P—12P, indicated in phantom). However, another way of so driving these members is provided by making a supporting flexure (here, af'–1) magnetic and providing a solenoid magnet for attractively pulling it (e.g. magnet am with coil ac to pull strip af'–1 and thus slug SL which, responsively, pulls the coupled-slug HS, as the motion-arrows indicate).

Equivalent "split-field" solenoid and "ring-armature" arrangements may be provided according to the invention within the contemplation of the appended claims, as those skilled in the art will appreciate—i.e. whereby one or more of the aforetaught features may be otherwise used, such as the features of providing an elongate armature combined with a solenoid pole arranged to present a "slotted-pole" construction, this flux being provided by one or more coils in pole-face-slots; more especially whereby a plurality of such grooved solenoids are provided in "push/pull" relation with such an armature; or where the armature comprises a flexure-strip; even more especially whereby an E-shaped or a U-shaped core is provided; or whereby such a slotted-pole solenoid is provided to actuate a ring flexure segment surrounding at least a portion of solenoid pole surfaces; or wherein a plurality of compact flexure-solenoid pole combination is arranged in alignment to comprise a common integral array along a lateral plane for print hammer actuation or the like.

While in accordance with the provisions of the patent law, the above has illustrated and described preferred forms of the invention and their illustrative operation and construction, it will be apparent to those skilled in the art that changes may be made in the apparatus described without departing from the spirit and scope of the invention as set forth in the appended claims and that in some cases, certain features of the invention may be used to advantage without a corresponding use of other features; or that certain features changed or substituted for, equivalently, as appreciated by those skilled in the art.

Having now described the invention, what is claimed as being new and to be secured by Letters Patent is:

1. A double-slug impacting arrangement comprising a pair of elongate slug means arranged in spaced, relatively parallel relation by a pair of like parallel eongate flexure-spring means; one of said slugs being mounted from a flexed base by a second pair of flexure spring means; said slugs being thus coupled so that actuation of one along a prescribed direction along its elongate axis acts to pull the other slug along the same direction, somewhat along its elongate axis.

2. The combination as recited in claim 1 wherein at least one of said second pair of flexure spring means comprises a magnetic armature-strip together with cooperating solenoid magnet means adapted to selectively attract said armature strip to provide said driving thrust.

3. A solenoid magnet assembly of the "clapper" type including armature means adapted to be flux-attracted toward one or more pole-face portions of a solenoid core; said armature means including a pair of elongate armature segments affixed at one end to project in opposed diverging relation from a common fixed base; said solenoid core being arranged in operative relation with an intermediate portion of each armature segment so that when energized both segments may be attracted together in a prescribed manner at least adjacent their free ends; and bending flexure means coupled between said free segment ends and adapted to provide a flexing bend-segment thrusting along a prescribed actuation path during said attraction; said flexure-coupling means including a resilient unitary flexure ring fastened between respective end portions of said armature segments so as to be squeezed during said attraction and thereby provide said thrusting.

4. A solenoid magnet assembly including armature means adapted to be flux attracted toward one or more pole-face portions of a solenoid core, said armature means including bending flexure means adapted to present a flexing bend-segment thrusting along a prescribed actuation path during said actuation; said armature means further including a unitary armature-ring adapted to be solenoid-attracted and stressed into two orthogonal dimensions, that is, to be squeezed in a first sense to provide said bending flexure thrusting in a first direction and also to be squeezed in a second sense to provide said thrusting in a second somewhat transverse to said first direction; and a pair of first and second solenoid magnet means adapted to coact with respective confronting portions of said ring to magnetically induce said respective squeezing.

References Cited

UNITED STATES PATENTS

| | | |
|---|---|---|
| 3,335,659 | 8/1967 | Schacht et al. |
| 3,273,093 | 9/1966 | Hayden _____ 335—279 XR |
| 3,049,990 | 8/1962 | Brown et al. |
| 2,120,178 | 6/1938 | Hausrath _____ 335—267 |
| 1,635,005 | 7/1927 | Norstrom _____ 335—279 XR |
| 3,453,572 | 7/1969 | Masterson _____ 335—276 |
| 376,752 | 1/1888 | Patterson _____ 74—102 |

FOREIGN PATENTS

| | | |
|---|---|---|
| 688,832 | 2/1940 | Germany. |
| 521,524 | 10/1953 | Belgium. |

OTHER REFERENCES

German Printed Application, DAS 1,088,593 September 1960, Kliemuth.

German Printed Application, DAS 1,142,034, January 1963, J. Wehrle.

BERNARD A. GILHEANY, Primary Examiner

D. M. MORGAN, Assistant Examiner

U.S. Cl. X.R.

335—274, 281

UNITED STATES PATENT OFFICE
CERTIFICATE OF CORRECTION

Patent No. 3,524,155                                      August 11, 1970

David W. Bernard

It is certified that error appears in the above identified patent and that said Letters Patent are hereby corrected as shown below:

Column 11, line 1, "eongate" should read -- elongate --; line 3, "flexed" should read -- fixed --. Column 12, line 6, after "second" insert -- direction --.

Signed and sealed this 16th day of March 1971.

(SEAL)
Attest:

Edward M. Fletcher, Jr.                          WILLIAM E. SCHUYLER, JR.
Attesting Officer                                       Commissioner of Patents